United States Patent [19]

Donatelle

[11] 4,033,218
[45] July 5, 1977

[54] TABLE-SAW GUARD
[75] Inventor: Leo P. Donatelle, Chicago, Ill.
[73] Assignee: Spanjer Brothers, Inc., Chicago, Ill.
[22] Filed: June 4, 1976
[21] Appl. No.: 692,809
[52] U.S. Cl. .................. 83/478; 83/397; 83/366; 83/70; 83/63; 83/DIG. 1
[51] Int. Cl.² .......................... B27G 19/02
[58] Field of Search ........... 83/478, 366, 397, 399, 83/400, 860, DIG. 1

[56] References Cited
UNITED STATES PATENTS

| | | | |
|---|---|---|---|
| 1,900,553 | 3/1933 | Hampton | 83/397 |
| 3,105,530 | 10/1963 | Peterson | 83/478 |
| 3,805,658 | 4/1974 | Scott et al. | 83/DIG. 1 |
| 3,880,032 | 4/1975 | Green | 83/478 |

Primary Examiner—Donald R. Schran
Attorney, Agent, or Firm—John R. Diver; Chas. W. Rummler

[57] ABSTRACT

A table-saw having dual guards, one being that for the saw to run the guard must always be in correct vertical and horizontal operating position covering the whirling saw blade, and the other being that the saw is automatically shut off after a waiting period in the event that the operator is not actually working at a sawing operation. There is a manual over-ride switch for hard-to-do jobs subject to the security of lock and key.

8 Claims, 5 Drawing Figures

U.S. Patent  July 5, 1977  Sheet 1 of 2  4,033,218
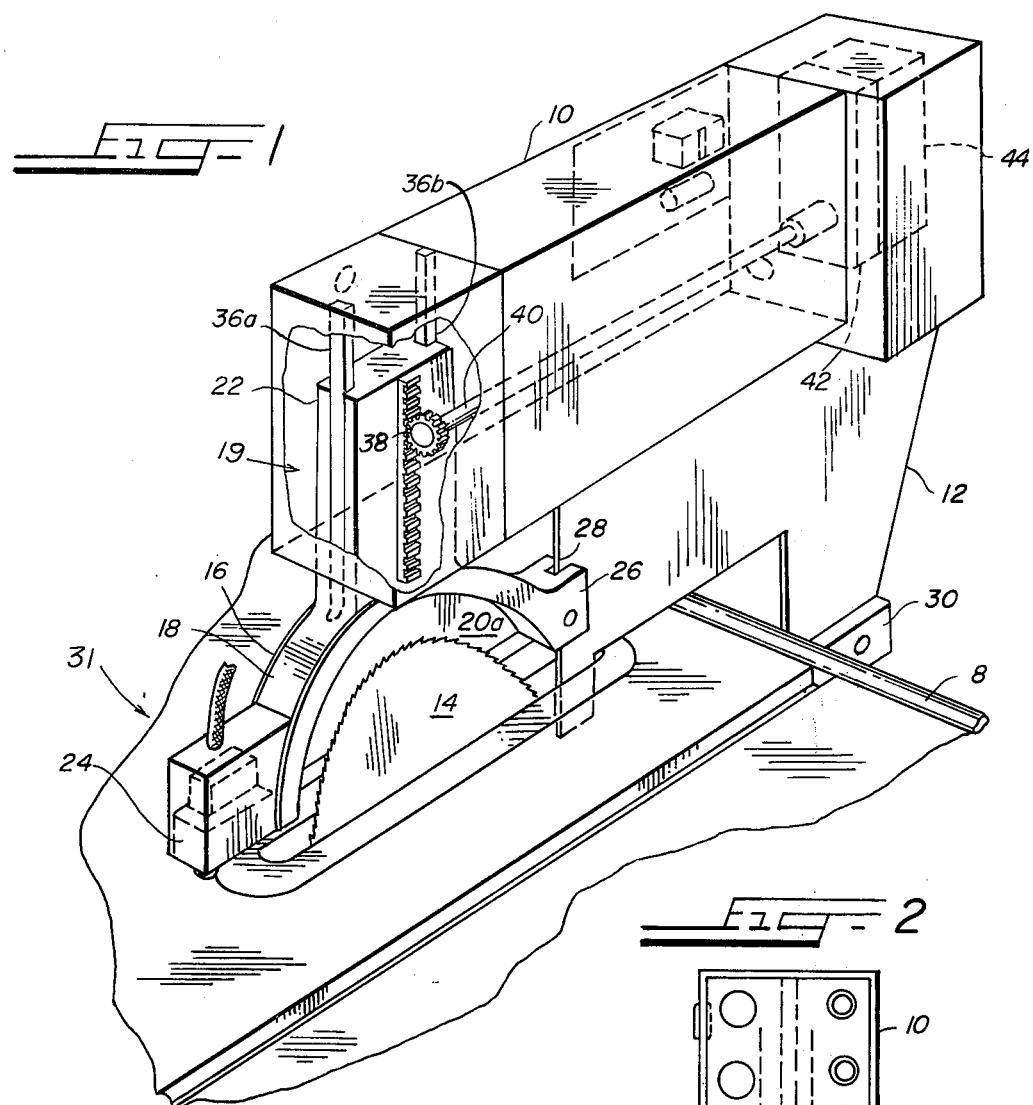
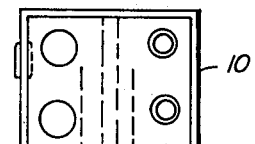
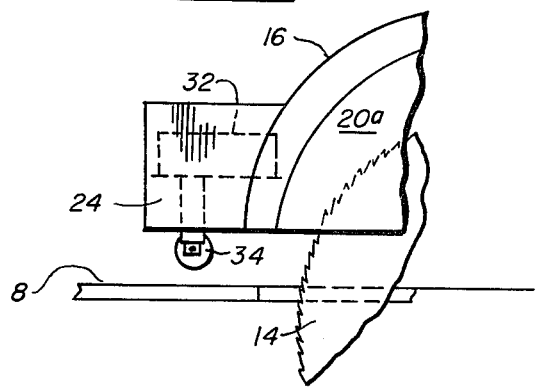
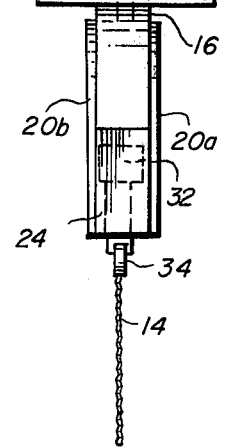

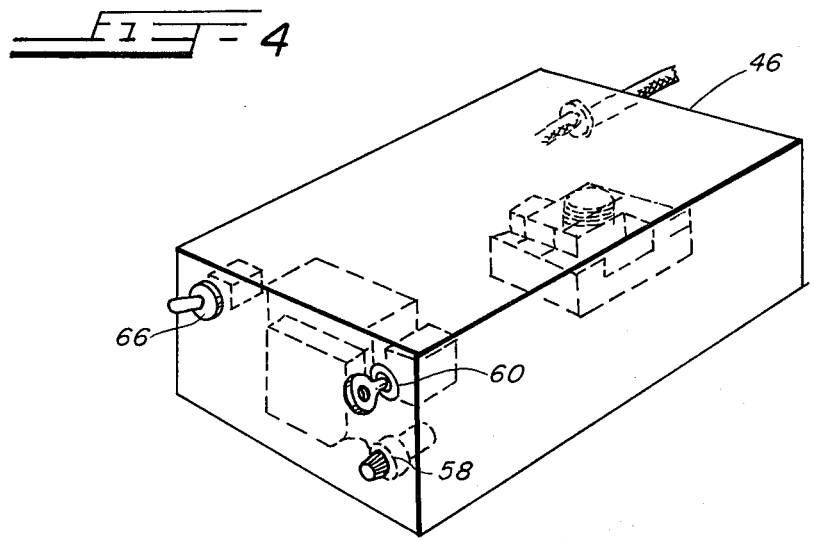
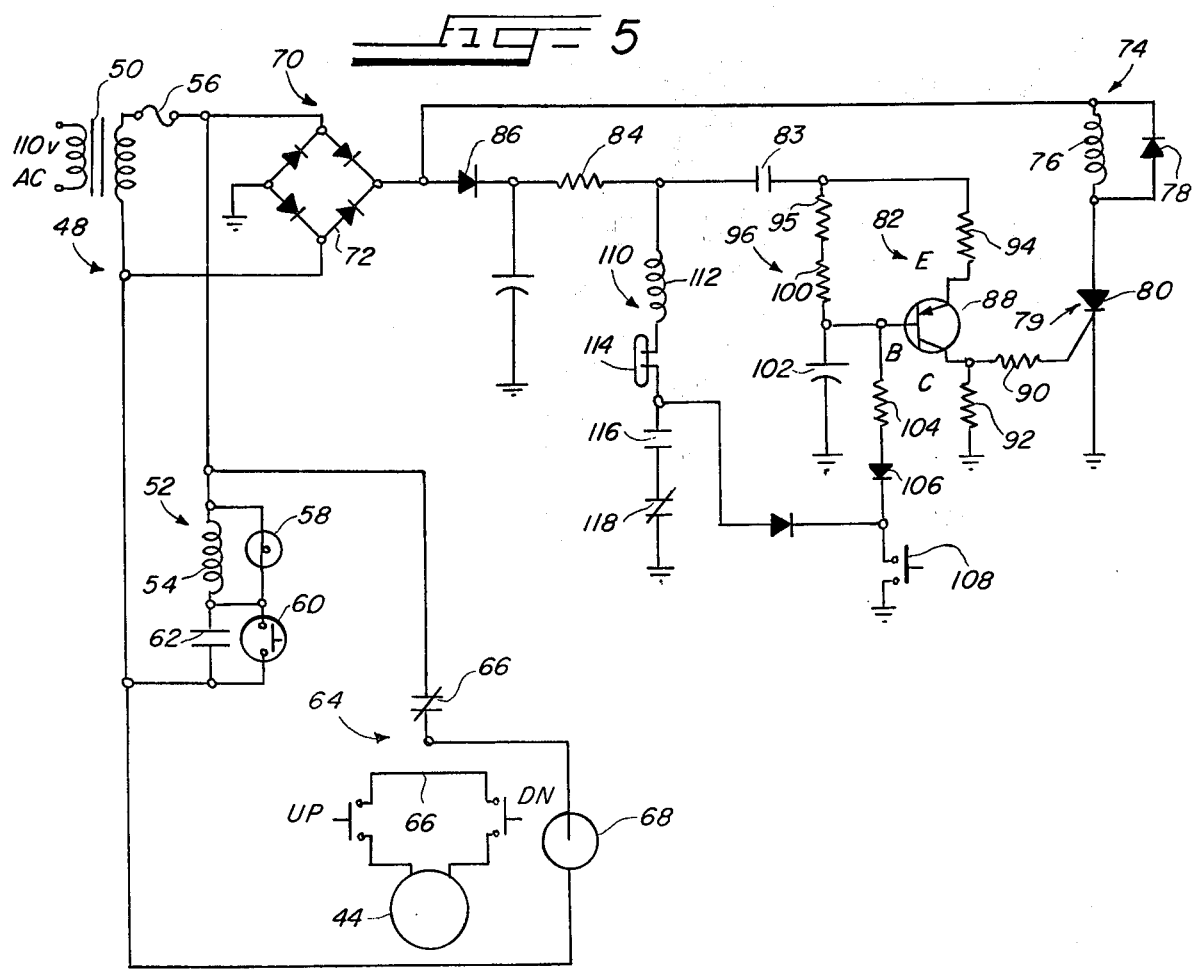

TABLE-SAW GUARD

BACKGROUND OF THE INVENTION

Safety precautions in the woodworking shop require shields which surround whirling saw blades and project forwardly from the cutting edge thereof, the shield being arranged for pivotal movement on a horizontal axis so that as the piece to be cut is introduced to the shield, the shield is tilted upwardly to provide clearance for the piece introduction. As the piece passes beneath the shield and through the saw blade, the shield is brought back downwardly in a horizontal position over the piece being cut for protecting the operator from the saw.

There is no suggestion of any arrangement for stopping operation of the saw motor when the guard is tilted for introduction of the piece to be cut Inasmuch as there is nothing in the prior art on controlling the operation of the saw motor establishing the operating parameters that the guard must always be in operating position as actuated by the thickness of material being cut for the saw motor to run, and/or in the event that the operator should move away from the table without pushing the motor-stop button whereby a time-delay switch will automatically shut off the motor after the passage of the set period of time, there is thus an established need for a combination of electrical controls with an actuating mechanism for the guard which will perform these operations.

SUMMARY OF THE INVENTION

The gist of this table-saw guard lies in a motor-starter circuit having automatic switchgear in combination with the saw motor and mechanism for operating the guard which will shut off the saw-motor drive if said guard is not in the correct operating position covering the whirling blade. A limit switch senses the position of the guard above the thickness of the material being cut, and a mercury switch senses if the guard is not perfectly horizontal thereabove. A time-delay circuit in series with the limit and mercury switch circuits shuts off the saw motor should the operator move away from the table without first pushing the stop-button in the saw motor starter box and 42 seconds shall have passed. A lock and key switch manually over-rides the automatic shut-off switchgear for hard-to-do-jobs.

DESCRIPTION OF THE DRAWINGS

FIG. 1 shows a perspective cut-away fragmentary view of the table-saw guard of this invention;

FIG. 2 shows a front view of the same;

FIG. 3 shows an enlarged fragmentary side view of the mechanically-operated limit microswitch mounted near the cutting teeth of the saw in the path of the workpiece and actuated by its passage;

FIG. 4 shows the bypass switchbox for hard-to-do jobs, the key to which is held by the supervisor; and FIG 5 shows a schematic diagram for the guard and work positioning and time delay power shut-off circuits.

DESCRIPTION OF THE PREFERRED EMBODIMENT

Referring to FIG.1, a table 8 supports an overhead arm 10 having a rear portion which is mounted on a thin steel strut plate 12 which in turn is supported on the table 8 in alignment with and having a thickness no greater than a saw blade 14. A guard 16 comprising an arcuate yoke 18 having front and rear arms which surround the portion of the blade at the saw 14 projecting above the top surface of table 8 projects downwardly from the front portion of the arm 10 in the direction of contacting its lower surface with the top surface of the workpiece (not shown) below having a guard vertical-positioning means 19 movably adapted for motion up and down of the guard 16 in the vertical direction relative thereto. Right-hand and left-hand clear plastic covers 20a and 20b, as shown in FIG. 2, cover each side of the arcuate yoke 18 disclosing that portion of the blade of the saw 14 above the top surface of table 8 centrally located therebetween and both sides of the peice work being fed to the saw below for full view by the operator while the cut is being made with the full protective benefit of the guard 16 in place. A yoke shank 22 which is structurally a portion of the arcuate yoke 18 extends upwardly from the central portion thereof into the front portion of beam 10. Pads 24 and 26 extend forwardly and rearwardly from the front and rear arms of the arcuate yoke 18, respectively, having lower surfaces contacting the top surface of the workpiece below. First tongue and groove joint 28 slidingly mates the aft end of pad 28 with the front vertical edge of thin strut plate 12 for guiding the arms of the yoke 18 in their vertical up and down movement relative to the workpiece below. Guard tilt-hinging means 30 which is structurally mounted on table 8 below the top surface thereof engages the strut plate 12 for lateral support which is adjustable in the fore and aft and hinged in the up and down directions in order to properly locate the guard 16 with respect to the saw 14 and the workpiece being operated upon below.

Reference to FIG. 3 shows a guard vertical position-sensing saw-motor shut-off switching means 31 comprising a limit switch 32 which mounts on pad 24 off the forward arm of yoke 16 having an actuating roller plunger 34 which extends in a downwardly direction therefrom for contacting the top surface of the workpiece below and making electrical contact therein whenever a workpiece of predetermined thickness is in postion for cutting. The electrical contact in the switch 32 is opened immediately when the workpiece is removed.

Second tongue and groove joints 36a and 36b each slidingly mate each of the fore end and midportion of arm 10 with each of the fore and back sides of the yoke shank 22, respectively, as shown in FIG. 1, for guiding the shank 22 of the yoke 18 in its vertical up and down movement relative to the workpiece below. Rack and pinion drive 38 mounts on the right side of the yoke shank 22 having one end of a pinion drive shaft 40 extending rearward therefrom wholly within the overhead arm 10 for moving the guard 16 in its vertical up and down movement relative to the workpiece below. A step-down gear box 42, having a reversing motor drive 44 operatinally connected thereto, mounts on the rear end of arm 10 and operationally couples its output shaft to the other end of the pinion drive shaft 40, for driving the rack and pinion drive 38 and moving the guard 16 in its vertical up and down movement.

As shown in FIGS. 4 and 5, a control box 46 mounts on beam 10, having a source of 110 volts A.C. power including D.C. power supply circuit 70 which shunts across the secondary of a transformer 50 having its primary connected to an A.C. power source through the fuse 56. Circuit 70 comprises a full-wave bridge rectifier 72 operationally connecting to the power source, and a saw-motor starter circuit 74 having a second relay-actuating coil 76 operationally connecting one terminal thereof to the hot output of rectifier bridge 72. A voltage limiting diode 78 shunts out relay coil 76.

A saw-motor starting circuit switching means 79 comprising a triac 80 operationally connects its main terminal 2 to the other terminal of the coil 76 and its main terminal 1 to ground for switching the saw-motor starter circuit 74 on and off. A triac trigger circuit 82, which series-connects its input through a first relay-actuated switch 83 having first, and fourth relay-actuating coils 112 and 116, respectively (not shown), a first resistor 84 and a diode 86 to the hot output of rectifier bridge 72, comprises a PNP transistor 88 having its collector terminal connected through a second resistor 90 to the gate terminal of said triac 80 and through a parallel third resistor 92 to ground. The emitter terminal of said transistor 88 connects to the output terminal of first switch 82 through a third resistor 94.

A time-delay saw-motor shut-off circuit 96 comprises series-connected resistances 98 and 100 which connects its input terminal to the output terminal from first switch 82. The base terminal of transistor 88 connects to the output terminal of series-connected fourth and fifth resistances 98 and 100. A first capacitor 102 connects its high-voltage terminal to the output terminal of series-connected resistances 98 and 100 and its low-voltage terminal to ground. A sixth resistance 104 connects its input terminal to the base terminal transistor 88 and its output terminal through diode 106 in series-connection with two-point make limit microswitch 108.

A guard horizontal position-sensing saw-motor shut-off switching means 110, which connects to the output of first resistor 84, comprises a first relay coil 112 having its input terminal connecting to the output thereof. A mercury switch 114, which horizontally mounts on the guard arm 10 and is oriented in the fore-and-aft direction thereon, connects its input terminal to the output terminal of coil 112. A second relay-actuated switch 116 having first and third relay-actuating coils 112 and 54, respectively, connects its input terminal to the output terminal of the mercury switch 114 and its output terminal to the input terminal of a third relay-actuated switch 118 having first and second relay-actuating coils 112 and 76, respectively, the output of which connects to ground.

In the control box 46, having the source of 110 volt A.C. power, an A.C. power supply circuit 48 operationally connected thereto comprises the step-down transformer 50, a guard-motor starter box 52 operationally connected thereto having a third relay-actuating coil 54 connected at one terminal thereof through the fuse 56 to one terminal of the secondary of the step-down transformer 50. A runlight (green) 58 shunts across the relay coil 54. A bypass keyswitch 60 which is in series connection with the relay coil 54 operationally connects the same across the secondary of transformer 50 through fuse 56 when closed. A third relay-actuated switch 62 having first and second relay-actuating coils shunts across the keyswitch 60. A fourth reversing polarity means 64 having first and second up/on push-button switches 66 operationally actuating relay-actuating coil 54 operationally connects with the reversing A.C. motor 44 for moving the guard 16 in its vertical up and down movement relative to the workpiece below accoding to the setting of toggle switch 66 on the front panel of control box 46. A set material thickness light (red) 68 shunts across the motor 44.

An operator has 42 seconds to start a cut after setting the guard 16 at its working height, by means of the switch means 66, where the roller plunger 34 contacts the workpiece to close the switch 32. As long as the operator is operating or cutting, the saw 14 will continue to run. If the operator leaves the site of operation without turning the saw 14 off, the switch 32 will be open and the saw 14 will be shut off automatically after the present waiting period, for example, the before mentioned 42 seconds.

There is a bypass keyswitch 60 for hard-to-do-jobs. However, the key of switch 60 is held by the supervisor who must then supervise the setting of the saw 14 and make sure that it is put back into the automatic safety position.

It will be understood that details of the construction shown may be altered or omitted without departing from the sprit of the invention as defined by the following claims.

I claim:
1. In a table-saw having a saw-motor drive with a motor starting circuit connected to a source of power and a saw guard mounted on one end of an overhead arm with a hinge-means mounted on the table at the other end of the arm for tilting said arm relative to the table, the combination with said table-saw of:
  a. a saw-motor starting circuit switching means having a gate terminal operationally connected through the motor starting circuit to the source of power;
  b. a vertical-positioning means for the guard mounted between the guard and the arm and operationally connected to ground from the source of power through a manually-operated reversing-polarity switching means, having a vertical position-sensing, saw-motor shut-off means mounted between the workpiece and the guard operationally connected through the saw-motor starting circuit switching means to ground for shutting off the saw-motor drive from said source of power when the guard is above the top surface of the workpiece by a predetermined space;
  c. a horizontal, position-sensing, saw-motor shut-off means for the guard operationally mounted on the arm and operationally connected to the source of power through the saw-motor starting circuit switching means to ground for shutting off the saw-motor drive from said source of power when the guard is not horizontal; and
  d. a vertical and horizontal, position-sensing, saw-motor drive time-delay shut-off means for the guard operationally mounted on the arm and between the workpiece and the guard and operationally connected from the source of power through the saw-motor starting circuit switching means to ground for providing the operator with a time delay during which the saw-motor will start and run as long as saw-cutting continues.

2. In a table-saw as set forth in claim 1 wherein the vertical, position-sensing, saw-motor drive shut-off means for the guard comprises:
  a. a limit microswitch mounted on the guard having an operational relation with respect to the workpiece;

whereby the saw-motor drive is shut off when the guard is above the top surface of the workpiece by a predetermined space.

3. In the table-saw as set forth in claim 2 wherein the saw-motor starting circuit switching means comprises:
   a. an electronic valving means having a base terminal operationally connected through a first resistance and a diode and the limit microswitch to ground, an emitter terminal and a collector terminal, the one operationally connected from the source of power and the other operationally connected through a second resistance to ground;
   b. a time-delay circuit having a third resistance operationally connected at one end to the source of power and at the other end to the base terminal of the electronic valving means, and a capacitance having one terminal connected to the other end of the fourth resistance and the other terminal to ground; and
   c. a triac having its main terminal operationally connected from the source of power through the starting circuit of the saw-motor, its second terminal operationally connected to ground, and its gate terminal operationally connected through a fifth resistor to the collector terminal of the electronic valving means.

4. In a table-saw as set forth in claim 1 wherein the vertical-positioning means for the guard comprises:
   a. a shank member supporting said guard having sliding ways operationally mounted between said shank and the overhead arm;
   b. a rack-and-pinion drive operationally connected to the shank member;
   c. a reversing motor drive mounted on the arm and operationally connected to said rack-and-pinion drive; and
   d. a manually-operated reversing-polarity switch operationally connected from the source of power through the starter circuit of said reversing motor drive to ground.

5. In a table-saw as set forth in claim 1 wherein the horizontal, position-sensing, saw-motor drive shut-off means for the guard comprises:
   a. a mercury switch circuit operationally mounted on the overhead arm and operationally connected through the limit microswitch to the saw-motor starting circuit switching means;
whereby the saw-motor drive is shut off when the guard is not horizontal.

6. In a table-saw having a saw-motor drive with a motor starting circuit connected to a source of power and a saw guard mounted on one end of an overhead arm with a hinge-means mounted on the table at the other end of the arm for tilting said arm relative to the table, the combination with said table saw of:
   a. a shank member on said saw guard for supporting the guard from the overhead arm and having sliding ways operationally mounted between the shank member and the overhead arm;
   b. a rack-and-pinion drive operationally connected to said shank member;
   c. a reversing motor drive mouunted on the overhead arm and operationally connected to said rack-and-pinion drive, said reversing motor having a starting circuit; and
   d. a manually operated reversing-polarity switch operationally connected from the source of power through the starter circuit of the said reversing motor drive to ground.

7. In a table saw comprising an overhead arm hinged to the table at the rear thereof having a rear portion mounted on a steel strut in alignment with and having a thickness no greater than the blade of the saw, the combination with said overhead arm of a guard comprising and arcuate yoke having front and rear arms extending downwardly therefrom surrounding and above the portion of the saw blade projecting above the top surface of said table and having a vertical positioning means adapted for moving said guard up and down in the vertical direction relative to the saw table; a yoke shank attaching to the top portion of the arcuate yoke extending upwardly from the central portion thereof; first and second pads each extending forwardly and rearwardly from the front and rear arms of said arcuate yoke; a first tongue and groove joint slidingly mating the rear end of said second pad with the front vertical edge of said strut for guiding the guard in its vertical up and down movement; second tongue and groove means slidingly mating said overhead arm with the front and back sides of the yoke shank; a rack and pinion drive connecting one face of said yoke shank with said arm and having a pinion drive shaft extending rearward from the said shank; a reversing motor drive operationally connected to said drive shaft adjacent to the rear end of said overhead arm; a source of electric power for said reversing motor; and switch means for controlling the operation of said motor.

8. In a table saw comprising an overhead arm hinged to the table at the rear thereof having a rear portion mounted on a steel strut in alignment with and having a thickness no greater than the blade of the saw, the combination with said overhead arm of the guard comprising an arcuate yoke having front and rear arms extending downwardly therefrom surrounding and above the portion of the saw blade projecting above the top surface of said table and having a vertical positioning means adapted for moving said guard up and down in the vertical direction relative to the saw table; a yoke shank attaching to the top portion of the arcuate yoke extending upwardly from the central portion thereof; first and second pads each extending forwardly and rearwardly from the front and rear arms of said arcuate yoke; a first tongue and groove joint slidingly mating the rear end of said second pad with the front vertical edge of said strut for guiding the guard in its vertical up and down movement; second tongue and groove means slidingly mating said overhead arm with the front and back sides of the yoke shank; a rack and pinion drive connecting one face of said yoke shank with said arm and having a pinion drive shaft extending rearward from the said shank; a reversing motor drive operationally connected to said drive shaft adjacent the rear end of said overhead arm; a source of A.C. power including a D.C. power supply shunting the secondary of a transformer having its primary connected to the A.C. source; a fuse and a full-wave bridge rectifier operationally connecting its input to the A.C. power source; a D.C. saw-motor starting box relay coil operationally connecting one terminal thereof to the output of the rectifier bridge; a voltage limiting diode shunting the D.C. saw-motor starting box relay coil; a triac operationally connecting its main terminal to the other terminal of the D.C. saw-motor starting box relay coil and its main terminal to ground; a first relay-actuated switch, a first resistor and a diode series-connecting to the output of the rectifier bridge; a PNP transistor having its collector terminal connecting through a second resistor to the gate terminal of said triac and through a parallel third resistor to ground, its emitter terminal connecting to the output terminal of the first relay-actuated switch through a third resistor, and its base terminal connecting to the output terminal of series-connected fourth and fifth resistances also connecting to the output terminal of the first relay-actuated switch; a first capacitor connecting its high-voltage terminal to the output terminal of series-connected fourth and fifth resistances and its low-voltage terminal to ground; a sixth resistance connecting its input terminal to the base terminal of said transistor and its output terminal through a diode in series-connection with two-point-make microswitch to ground; a first relay coil having its input terminal connecting to the output terminal of the first resistor; a mercury switch horizontally mounting on the first pad oriented in the fore-and-aft direction thereon relative to the overhead arm connecting its input terminal to the output terminal of said first relay coil; a second relay-actuated switch connecting its input terminal to the outut terminal of the mercury switch and its output terminal to the input terminal of a third relay-actuated switch, the output of which connects to ground; a guard-motor starter box operationally connected to the source of A.C. power having a third relay-actuating coil connecting at one terminal thereof through the fuse to one terminal of the secondary of the step-down transformer; a runlight (green) shunting the third relay-actuating coil; a bypass keyswitch in series connection with the third relay-actuating coil operationally bypassing a third relay-actuated switch and connecting the same across the secondary of the transformer through the fuse; first and second pushbutton switches operationally actuating the third relay-actuating coil in the guard-motor starting box and operationally connecting the reversing A.C. motor to the secondary of the transformer for up and down movement of the guard; and a set material thickness light (red) shunting the reversing A.C. motor.

* * * * *